US012672938B2

(12) United States Patent
Qiu et al.

(10) Patent No.: US 12,672,938 B2
(45) Date of Patent: Jul. 7, 2026

(54) WATER PUMP AND ORAL IRRIGATOR

(71) Applicant: RISUN TECHNOLOGY (SHENZHEN) LIMITED, Shenzhen (CN)

(72) Inventors: Jinbo Qiu, Shenzhen (CN); Dongbao Li, Shenzhen (CN)

(73) Assignee: RISUN TECHNOLOGY (SHENZHEN) LIMITED, Shenzhen (CN)

(*) Notice: Subject to any disclaimer, the term of this patent is extended or adjusted under 35 U.S.C. 154(b) by 128 days.

(21) Appl. No.: 18/659,896

(22) Filed: May 9, 2024

(65) Prior Publication Data

US 2024/0315801 A1     Sep. 26, 2024

Related U.S. Application Data

(63) Continuation of application No. PCT/CN2023/130520, filed on Nov. 8, 2023.

(30) Foreign Application Priority Data

Mar. 21, 2023     (CN) .......................... 202310304986.0

(51) Int. Cl.
*A61C 1/00*          (2006.01)
*A61C 17/02*          (2006.01)
(Continued)

(52) U.S. Cl.
CPC ............ *A61C 1/0092* (2013.01); *A61C 17/02* (2013.01); *F04B 9/02* (2013.01); *F04B 9/04* (2013.01); *F04B 17/03* (2013.01)

(58) Field of Classification Search
CPC ......... A61C 1/0092; A61C 17/02; F04B 9/02; F04B 9/04; F04B 17/03
See application file for complete search history.

(56) References Cited

U.S. PATENT DOCUMENTS

| | | | | |
|---|---|---|---|---|
| 12,435,710 B1 * | 10/2025 | Liu | .......................... | F04B 9/042 |
| 2023/0240795 A1 * | 8/2023 | Liu | ...................... | A61C 1/0092 |
| | | | | 433/84 |

(Continued)

FOREIGN PATENT DOCUMENTS

| | | |
|---|---|---|
| CN | 111577565 A | 8/2020 |
| CN | 214499329 U | 10/2021 |

(Continued)

OTHER PUBLICATIONS

International Search Report and Written Opinion issued in corresponding PCT Application No. PCT/CN2023/130520, dated Jan. 12, 2024.

(Continued)

*Primary Examiner* — Hoang M Nguyen
(74) *Attorney, Agent, or Firm* — Westbridge IP LLC

(57)          ABSTRACT

Disclosed are a water pump and an oral irrigator. The water pump includes: a water pump assembly, a transmission assembly and a driving member connected in sequence. The water pump assembly includes a water pump housing, a piston is embedded in the water pump housing, and a connecting rod is provided at the piston. The transmission assembly includes a first transmission seat, a first rotating wheel is provided in the first transmission seat, and the first transmission seat is sleeved with a second transmission frame. The second transmission frame drives the connecting rod to perform linear motion, and a driven member is provided between the first rotating wheel and the second transmission frame. The driving member provides rotational power to the first rotating wheel and make the driven member drive the second transmission frame to perform linear motion to make the water pump pump water or deliver water.

9 Claims, 5 Drawing Sheets

(51) Int. Cl.
    *F04B 9/02*        (2006.01)
    *F04B 9/04*        (2006.01)
    *F04B 17/03*       (2006.01)

(56)              References Cited

U.S. PATENT DOCUMENTS

| | | | |
|---|---|---|---|
| 2024/0293209 A1* | 9/2024 | Liu ...................... | A61C 17/028 |
| 2025/0243853 A1* | 7/2025 | Wang ...................... | F04B 17/03 |

FOREIGN PATENT DOCUMENTS

| | | | |
|---|---|---|---|
| CN | 113719439 A | 11/2021 |
| CN | 114046234 A | 2/2022 |
| CN | 215918369 U | 3/2022 |
| CN | 217525451 U | 10/2022 |
| CN | 217813801 U | 11/2022 |
| CN | 116181600 A | 5/2023 |
| CN | 219492504 U | 8/2023 |
| JP | H06346839 A | 12/1994 |
| JP | 2001234850 A | 8/2001 |
| JP | 2002138955 A | 5/2002 |
| KR | 20230031400 A | 3/2023 |

OTHER PUBLICATIONS

First Office Action issued in counterpart Chinese Patent Application No. 202310304986.0, dated Mar. 18, 2025.
Second Office Action issued in counterpart Chinese Patent Application No. 202310304986.0, dated May 23, 2025.

\* cited by examiner

WATER PUMP AND ORAL IRRIGATOR

CROSS-REFERENCE TO RELATED APPLICATIONS

This application is a continuation application of International Application No. PCT/CN2023/130520, filed on Nov. 8, 2023, which claims priority to Chinese Patent Application No. 202310304986.0, filed on Mar. 21, 2023. The disclosures of the above-mentioned applications are incorporated herein by reference in their entireties.

TECHNICAL FIELD

The present application relates to the technical field of water pumps, and in particular to a water pump and an oral irrigator.

BACKGROUND

An oral irrigator is a structure configured to care for the oral cavity. The oral irrigator uses a certain pressure to spray the cleaning water column from the nozzle of the oral irrigator to clean the user's oral cavity. The oral irrigators are currently widely used in people's daily lives.

The Chinese utility model with authorization announcement number CN217525450U discloses an oral irrigator, which includes: an oral irrigator housing, an oral irrigator upper cover and a nozzle. The oral irrigator housing is slidingly connected with a water tank. The interior of the oral irrigator housing is provided with a water pump structure for spraying the water in the water tank from the nozzle. The water pump structure includes a first machine core frame and a second machine core frame that are detachably connected. A battery is installed on one side of the first machine core frame. One side of the second movement frame is provided with a control assembly for controlling the working status of the oral irrigator. The first machine core frame and the second machine core frame are provided with motors. One end of the motor is provided with a driving wheel, and the driving wheel is meshed with a driven wheel. Both the driving wheel and the driven wheel are spiral bevel gears. The driven wheel is connected with a water pump assembly. The oral irrigator housing is provided with a locking assembly for locking and installing the nozzle. The second machine core frame is provided with a shock-absorbing assembly for shock-absorbing the water pump structure. However, the driven wheel is designed as a large plastic gear, after long-term use of the oral irrigator, the gear between the driving wheel and the driven wheel will be greatly worn, and the noise produced is also loud. Using this transmission method will cause great wear and tear on the sealing ring in the water pump, thus reducing the service life of the oral irrigator.

Therefore, how to provide a water pump and an oral irrigator to improve the operating performance of the water pump and extend the service life of the oral irrigator has become an urgent technical problem to be solved.

SUMMARY

The technical problem to be solved by the present application is how to provide a water pump and an oral irrigator to improve the operating performance of the water pump and extend the service life of the oral irrigator.

To this end, according to the first aspect, an embodiment according to the present application discloses a water pump including a water pump assembly, a transmission assembly and a driving member connected in sequence. The water pump assembly includes a water pump housing, a piston is embedded in the water pump housing, and a connecting rod is provided at the piston. The transmission assembly includes a first transmission seat, a first rotating wheel rotationally connected is provided in the first transmission seat, the first transmission seat is sleeved with a second transmission frame slidingly connected to the first transmission seat, the second transmission frame is configured to drive the connecting rod to perform linear motion, and a driven member is provided between the first rotating wheel and the second transmission frame. The driving member is configured to provide rotational power to the first rotating wheel and make the driven member drive the second transmission frame to perform linear motion, so as to make the water pump pump water or deliver water.

In an embodiment, the first rotating wheel is provided with a first moving groove with a closed head and a closed tail, a second accommodating groove is provided in the second transmission frame, and the driven member is abutted against the first moving groove and the second accommodating groove respectively.

In an embodiment, one end of the second transmission frame is provided with a third transmission frame detachably connected, a third accommodating groove adjacent to the second accommodating groove is provided in the third transmission frame, and the driven member is abutted against the third accommodating groove.

In an embodiment, the first transmission seat is provided with a notch for accommodating the driven member to perform linear movement.

In an embodiment, one end of the connecting rod is snapped into the piston, and another end of the connecting rod is detachably connected to the second transmission frame.

In an embodiment, a gearbox is provided at one end of the driving member, a driving gear is provided on an output shaft of the driving member, a driven gear is fixedly provided at one end of the first rotating wheel, an interior of the gearbox is sequentially provided with a first transmission gear, a second transmission gear and a third transmission gear that mesh with each other, the driving gear is configured to mesh with the first transmission gear, and the driven gear is configured to mesh with the third transmission gear.

In an embodiment, a plug-fitting box cover is provided on the gearbox, and the box cover is fixedly connected to the driving member and the first transmission seat respectively.

In an embodiment, the box cover is embedded with a slide rod, and a slide groove adapted to the slide rod is provided in the second transmission frame.

In an embodiment, one side of the water pump housing is provided with a water inlet end configured to be connected to a water tank pipeline of an oral irrigator, and a water outlet end is provided at one end of the water pump housing opposite to the connecting rod.

According to a second aspect, an embodiment according to the present application discloses an oral irrigator, which includes the water pump described in the first aspect.

In the present application, by the driving member, rotational power is provided to the first rotating wheel, and making the driven member to drive the second transmission frame to perform linear motion, so that the water pump can pump water or deliver water, thereby providing a water pump that effectively reduces the noise of the water pump and reduces the wear of the piston. Compared with traditional large plastic gears, the present application reduces gear wear, extends the service life of the water pump, and reduces the space occupied by the water pump, making it easier to perform miniaturization design of the oral irrigator.

BRIEF DESCRIPTION OF THE DRAWINGS

In order to explain the embodiments of the present application or the technical solutions in the related art more clearly, the accompanying drawings needed to be used in the description of the embodiments or the related art will be briefly introduced below. Obviously, the accompanying drawings in the following description are only some embodiments of the present application, and other accompanying drawings can be obtained based on the provided accompanying drawings without creative efforts for those of ordinary skill in the art.

DETAILED DESCRIPTION OF THE EMBODIMENTS

Figure 1:
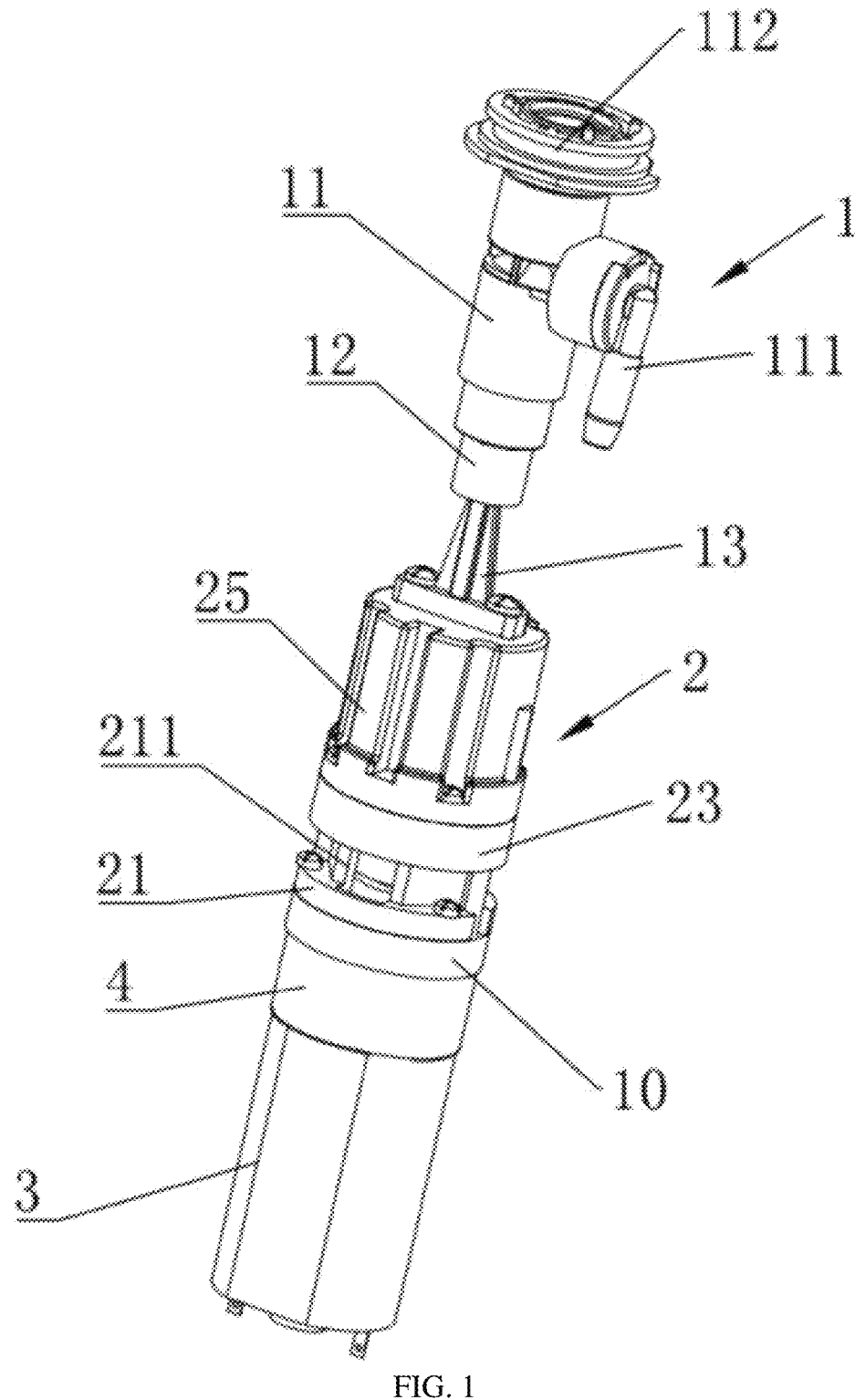
FIG. 1 is a schematic three-dimensional structural view of a water pump according to an embodiment of the present application.

In order to make the purpose, technical solutions and advantages of the present application more clear, the present application will be further described in detail below in conjunction with the accompanying drawings and embodiments. It should be understood that the specific embodiments described here are only used to explain the present application and are not used to limit the present application.

In the description of the present application, it should be noted that, unless otherwise clearly stated and limited, the terms "install", "joined" and "connect" should be understood in a broad sense. For example, it can be a fixed connection, a detachable connection or an integral connection; it can be a mechanical connection or an electrical connection; it can be a direct connection or an indirect connection through an intermediate medium; it can be an internal connection between two components, or the interaction between two components; it can be a wireless connection or a wired connection connect. For those of ordinary skill in the art, the specific meanings of the above terms in the present application can be understood on a case-by-case basis.

In the description of the present application, it should be noted that, the orientation or positional relationship indicated by the terms "center", "up", "down", "left", "right", "vertical", "horizontal", "inside", "outside", etc. is based on the orientation or positional relationship shown in the accompanying drawings, which are merely for convenience of describing the present application and simplifying the description, and do not indicate or imply that the devices or elements referred to must have a specific orientation or must be constructed and operated in a specific orientation, therefore, it cannot be construed as a limitation on the present application. Furthermore, the terms "first", "second" and "third" are used for descriptive purposes only and are not to be construed as indicating or implying relative importance.

In addition, the technical features involved in different embodiments of the present application described below can be combined with each other as long as they do not conflict with each other.

According to the first aspect, an embodiment of the present application discloses a water pump, as shown in FIG. 1 to FIG. 7, the water pump includes a water pump assembly 1, a transmission assembly 2 and a driving member 3 connected in sequence. The water pump assembly 1 includes a water pump housing 11, a piston 12 is embedded in the water pump housing 11, and a connecting rod 13 is provided at the piston 12. The transmission assembly 2 includes a first transmission seat 21, a first rotating wheel 22 rotationally connected is provided in the first transmission seat 21, and the first transmission seat 21 is sleeved with a second transmission frame 23 slidingly connected to the first transmission seat 21. The second transmission frame 23 is configured to drive the connecting rod 13 to perform linear motion, and a driven member 24 is provided between the first rotating wheel 22 and the second transmission frame 23. The driving member 3 is configured to provide rotational power to the first rotating wheel 22 and make the driven member 24 drive the second transmission frame 23 to perform linear motion, so as to make the water pump pump water or deliver water. In a specific implementation process, the driving member 3 can be a driving motor, and the interior of the first transmission seat 21 is provided with an accommodating cavity 212 for accommodating the rotation of the first rotating wheel 22.

It should be noted that by the driving member 3, the rotational power is provided to the first rotating wheel 22, and the driven member 24 is caused to drive the second transmission frame 23 to perform linear motion, so that the water pump can pump water or deliver water, thereby providing a water pump that effectively reduces the noise of the water pump and reduces the wear of the piston 12. Compared with traditional large plastic gears, the present application reduces gear wear, extends the service life of the water pump, and reduces the space occupied by the water pump, making it easier to perform miniaturization design of the oral irrigator.

Figure 2:
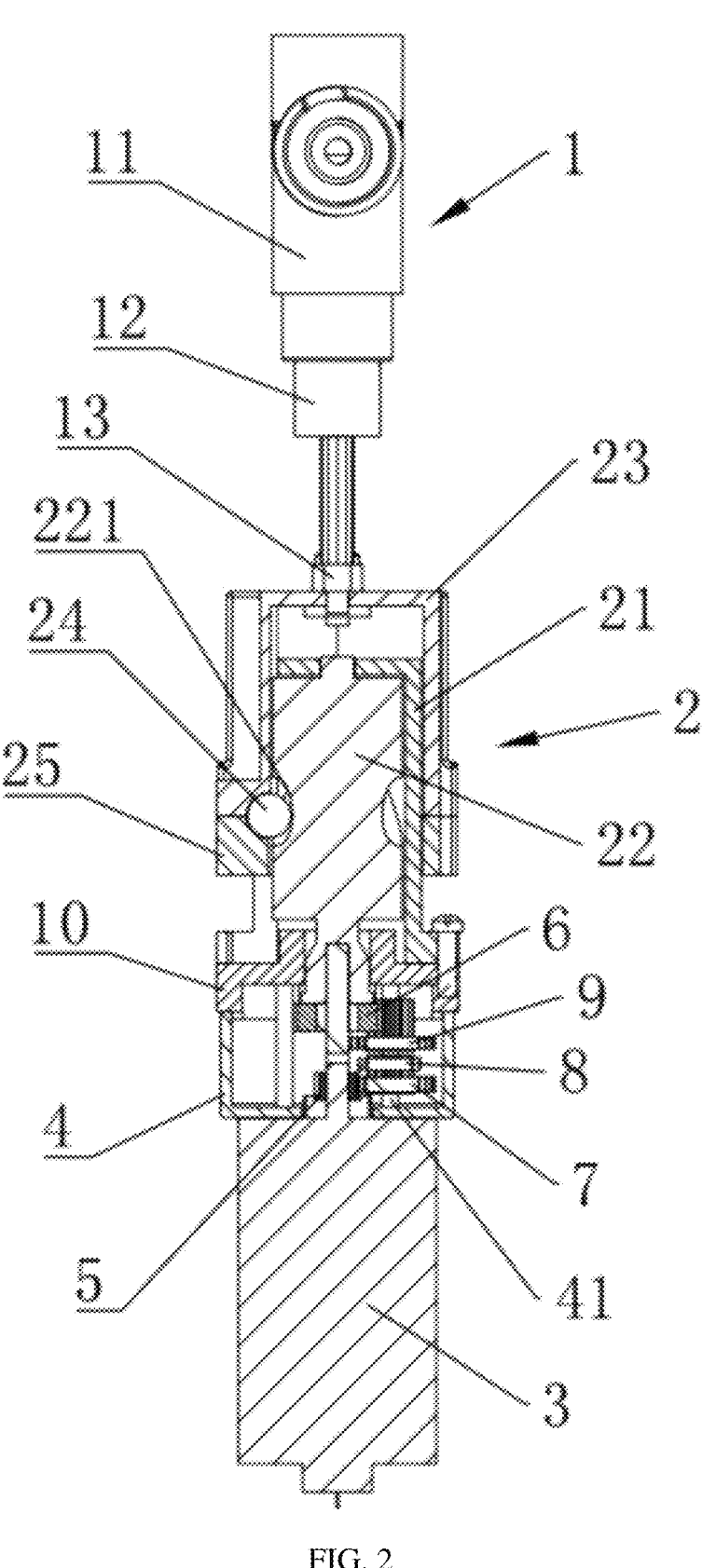
FIG. 2 is a schematic cross-sectional structural view of a water pump according to an embodiment of the present application.
Figure 3:
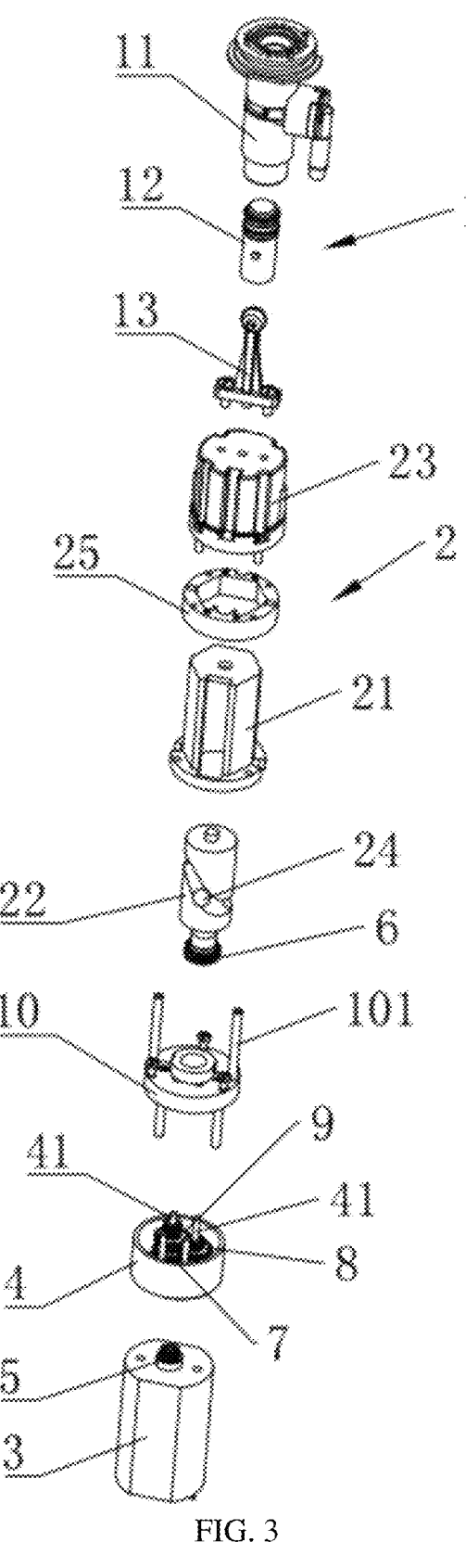
FIG. 3 is a schematic exploded structural view of a water pump according to an embodiment of the present application.
Figure 4:
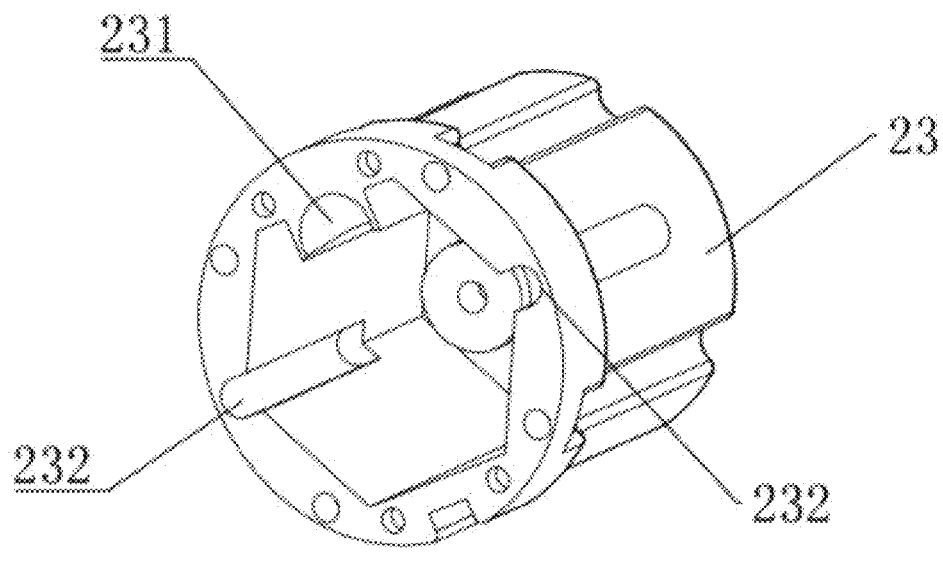
FIG. 4 is a schematic structural view of a second transmission frame in the water pump according to an embodiment of the present application.
Figure 5:
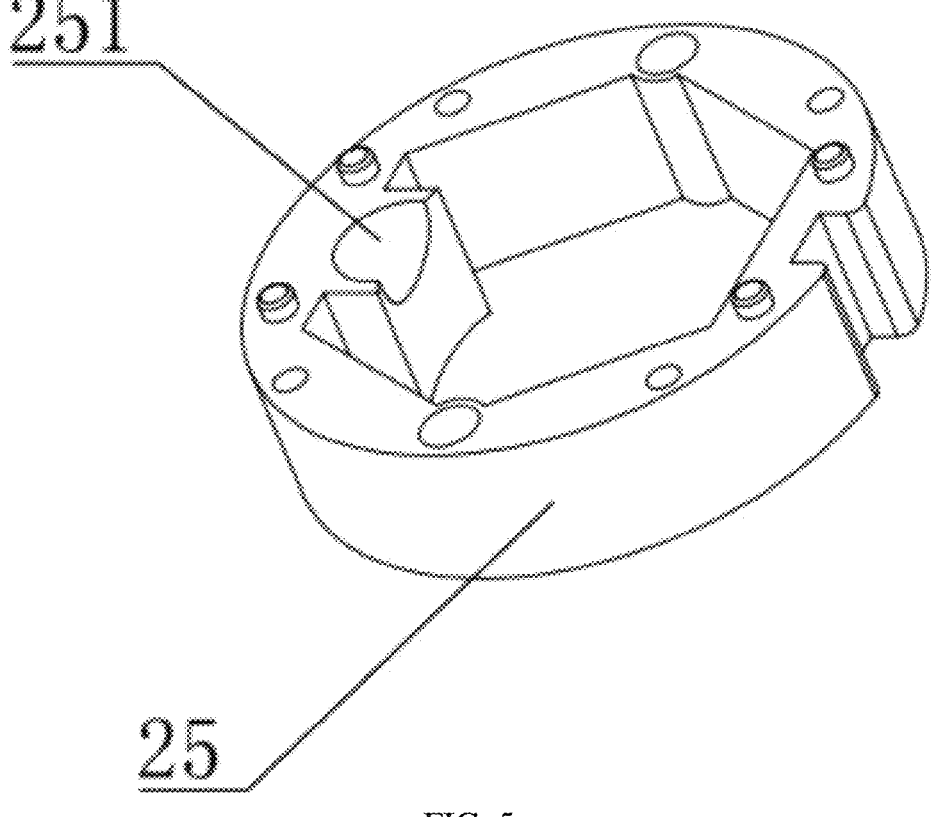
FIG. 5 is a schematic structural view of a third transmission frame in the water pump according to an embodiment of the present application.
Figure 7:
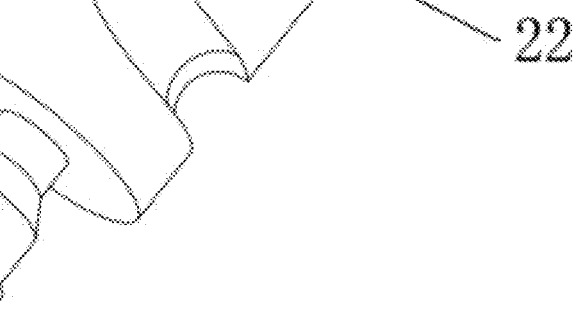
FIG. 7 is a schematic structural view of a first rotating wheel in the water pump according to an embodiment of the present application.

As shown in FIG. 2, FIG. 3 and FIG. 7, the first rotating wheel 22 is provided with a first moving groove 221 with a closed head and a closed tail, a second accommodating groove 231 is provided in the second transmission frame 23, and the driven member 24 is abutted against the first moving groove 221 and the second accommodating groove 231 respectively. In the specific implementation process, the first moving groove 221 is provided in a square loop shape. In the specific implementation process, the driven member 24 may be a roller ball, a cylinder, or a cylindrical pin integrated with the second transmission member 23.

As shown in FIG. 2 to FIG. 5, one end of the second transmission frame 23 is provided with a third transmission frame 25 detachably connected, a third accommodating groove 251 adjacent to the second accommodating groove 231 is provided in the third transmission frame 25, and the driven member 24 is abutted against the third accommodating groove 251. In the specific implementation process, both the inner walls of the second accommodating groove 231 and the inner walls of the third accommodating groove 251 are provided to be a cambered surface.

Figure 6:
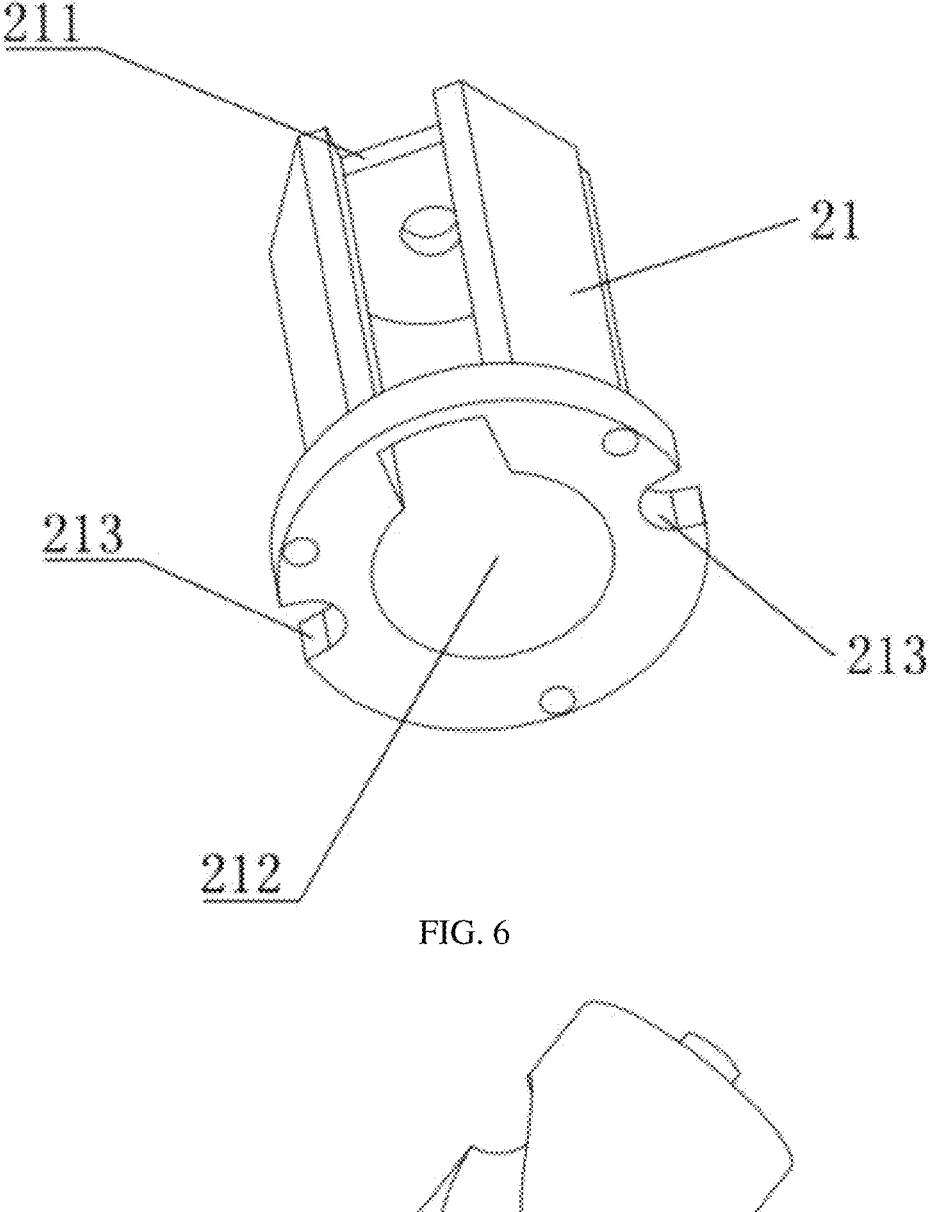
FIG. 6 is a schematic structural view of a first transmission seat in the water pump according to an embodiment of the present application.

As shown in FIG. 2, FIG. 3 and FIG. 6, the first transmission seat 21 is provided with a notch 211 for accommodating the driven member 24 to perform linear movement. It should be noted that by the setting of the notch 211, it is convenient for the driven member 24 to drive the second transmission frame 23 and the third transmission frame 25 to perform linear movement.

As shown in FIG. 2 and FIG. 3, one end of the connecting rod 13 is snapped into the piston 12, and another end of the connecting rod 13 is detachably connected to the second transmission frame 23. In the specific implementation process, the piston 12 is sleeved with two sealing rings, the connecting rod 13 and the second transmission frame 23 are fixedly connected by screws, a positioning column is provided on the connecting rod 13, and a positioning hole for positioning and matching with the positioning column is provided on the first transmission frame. The connecting rod 13 and the second transmission frame 23 may also be an integrally formed structure.

As shown in FIG. 2 and FIG. 3, a gearbox 4 is provided at one end of the driving member 3, and a driving gear 5 is provided on an output shaft of the driving member 3. A driven gear 6 is fixedly provided at one end of the first rotating wheel 22, an interior of the gearbox 4 is sequentially provided with a first transmission gear 7, a second transmission gear 8 and a third transmission gear 9 that mesh with each other. The driving gear 5 is configured to mesh with the first transmission gear 7, and the driven gear 6 is configured to mesh with the third transmission gear 9. In the specific implementation process, the diameter of the driving gear 5 is smaller than the inner diameter of the driven gear 6.

As shown in FIG. 2 and FIG. 3, a plug-fitting box cover 10 is provided on the gearbox 4, and the box cover 10 is fixedly connected to the driving member 3 and the first transmission seat 21 respectively. In the specific implementation process, four insert rods 41 are provided in the gearbox 4, and the box cover 10 is provided with jacks that are plugged and matched with the insert rods 41. The first transmission gear 7, the second transmission gear 8 and the third transmission gear 9 are respectively sleeved with the insert rod 41. The box cover 10 and the driving member 3 are connected by screws. The box cover 10 and the first transmission seat 21 are fixedly connected by screws.

As shown in FIG. 2 and FIG. 3, the box cover 10 is embedded with a slide rod 101, and a slide groove 232 adapted to the slide rod 101 is provided in the second transmission frame 23. In the specific implementation process, two slide rods 101 are provided, and the slide rods 101 pass through the third transmission frame 25. An opening 213 is provided on the first transmission seat 21. By the setting of the opening 213, it is convenient for the slide rod 101 to pass through the opening 213 and be inserted into the box cover 10.

As shown in FIG. 1, one side of the water pump housing 11 is provided with a water inlet end 111 configured to be connected to a water tank pipeline of an oral irrigator, and a water outlet end 112 is provided at one end of the water pump housing 11 opposite to the connecting rod 13.

It should be noted that the driving member 3 drives the driving wheel to rotate and drives the first transmission gear 7, the second transmission gear 8 and the third transmission gear 9 to rotate, causing the driven gear 6 to start rotating, and then driving the first rotating wheel 22 to rotate, so that the driven member 24 drives the second transmission frame 23 and the third transmission frame 25 to perform linear movement. Since the second transmission frame 23 and the connecting rod 13 are fixedly connected by screws, the connecting rod 13 is driven to perform linear motion. Since the head and tail of the first moving groove 21 are closed, the piston 12 is driven to perform reciprocating linear movement, allowing the water pump to pump water or deliver water.

According to a second aspect, an embodiment of the present application discloses an oral irrigator, which includes the water pump of the first aspect.

Working principle: by the driving member 3, rotational power is provided to the first rotating wheel 22, and the driven member 24 is caused to drive the second transmission frame 23 to perform linear motion, so that the water pump can pump water or deliver water, thereby providing a water pump that effectively reduces the noise of the water pump and reduces the wear of the piston 12. Compared with traditional large plastic gears, the present application reduces gear wear, extends the service life of the water pump, and reduces the space occupied by the water pump, making it easier to perform miniaturization design of the oral irrigator.

Obviously, the above-mentioned embodiments are only examples for clear explanation and are not intended to limit the implementation. For those of ordinary skill in the art, other different forms of changes or modifications can be made based on the above description. An exhaustive list of all implementations is neither necessary nor possible. The obvious changes or modifications derived therefrom are still within the scope of the present application.

What is claimed is:

1. A water pump, comprising:

a water pump assembly, a transmission assembly and a driving member connected in sequence; wherein the water pump assembly comprises a water pump housing, a piston is embedded in the water pump housing, and a connecting rod is provided at the piston;

the transmission assembly comprises a first transmission seat, a first rotating wheel rotationally connected is provided in the first transmission seat, the first transmission seat is sleeved with a second transmission frame slidingly connected to the first transmission seat, the second transmission frame is configured to drive the connecting rod to perform linear motion, and a driven member is provided between the first rotating wheel and the second transmission frame;

the driving member is configured to provide rotational power to the first rotating wheel and make the driven member drive the second transmission frame to perform linear motion, so as to make the water pump pump water or deliver water; and a gearbox is provided at one end of the driving member, a driving gear is provided on an output shaft of the driving member, a driven gear is fixedly provided at one end of the first rotating wheel, an interior of the gearbox is sequentially provided with a first transmission gear, a second transmission gear and a third transmission gear that mesh with each other, the driving gear is configured to mesh with the first transmission gear, and the driven gear is configured to mesh with the third transmission gear.

2. The water pump of claim 1, wherein the first rotating wheel is provided with a first moving groove with a closed head and a closed tail, a second accommodating groove is provided in the second transmission frame, and the driven member is abutted against the first moving groove and the second accommodating groove respectively.

3. The water pump of claim 2, wherein one end of the second transmission frame is provided with a third transmission frame detachably connected, a third accommodating groove adjacent to the second accommodating groove is provided in the third transmission frame, and the driven member is abutted against the third accommodating groove.

4. The water pump of claim 2, wherein the first transmission seat is provided with a notch configured to accommodate the driven member for linear movement.

5. The water pump of claim 1, wherein one end of the connecting rod is snapped into the piston, and another end of the connecting rod is detachably connected to the second transmission frame.

6. The water pump of claim 1, wherein a plug-fitting box cover is provided on the gearbox, and the box cover is fixedly connected to the driving member and the first transmission seat respectively.

7. The water pump of claim 6, wherein the box cover is embedded with a slide rod, and a slide groove adapted to the slide rod is provided in the second transmission frame.

8. The water pump of claim 1, wherein one side of the water pump housing is provided with a water inlet end configured to be connected to a water tank pipeline of an oral irrigator, and a water outlet end is provided at one end of the water pump housing opposite to the connecting rod.

9. An oral irrigator comprising the water pump of claim 1.

\* \* \* \* \*